United States Patent [19]

Seko et al.

[11] Patent Number: 4,565,997
[45] Date of Patent: Jan. 21, 1986

[54] WARNING DEVICE FOR A VEHICLE

[75] Inventors: Yasutoshi Seko, Yokohama; Takayuki Yanagishima, Yokosuka, both of Japan

[73] Assignee: Nissan Motor Company, Limited, Kanagawa, Japan

[21] Appl. No.: 377,267
[22] PCT Filed: Sep. 8, 1981
[86] PCT No.: PCT/JP81/00224
§ 371 Date: May 6, 1982
§ 102(e) Date: May 6, 1982
[87] PCT Pub. No.: WO82/00802
PCT Pub. Date: Mar. 18, 1982

[30] Foreign Application Priority Data

Sep. 8, 1980 [JP] Japan ................................. 55-124165

[51] Int. Cl.[4] ............................................. B60Q 1/00
[52] U.S. Cl. ................................. 340/576; 340/52 R; 340/575; 180/272
[58] Field of Search ............. 340/575, 576, 573, 52 R, 340/52 D, 53; 180/272; 128/719

[56] References Cited

U.S. PATENT DOCUMENTS 3,222,639 12/1965 Kayser, Jr. .
3,227,998 1/1966 Platt .
3,654,599 4/1972 Sepper ................................. 340/576
3,794,969 2/1974 Klopfenstein et al. .
3,877,541 4/1975 Takeuchi et al. ................... 340/576
4,007,357 2/1977 Yanagishima ..................... 340/52 R
4,017,843 4/1977 Yanagishima .
4,104,621 8/1978 Yanagishima et al. ............. 340/576
4,224,609 9/1980 Yanagishima .

Primary Examiner—John W. Caldwell, Sr.
Assistant Examiner—Michael F. Heim
Attorney, Agent, or Firm—Lowe, King, Price & Becker

[57] ABSTRACT

A warning device for a vehicle comprises a steering angle detector 10 producing steering angle pulses $S_2$, $S_3$ indicative of the steering angle and the steering direction whenever the variation of the steering angular position exceeds a predetermined angle, a dozing detecting circuit 16 which distinguishes that the driver is in normal condition when excessively frequent steering operations in one direction are performed and distinguishes that the driver is dozing to produce a warning signal when steering operations, each of which does not exceed the predetermined angle in one direction, are repeated at a rate greater than a predetermined frequency, and a warning means 26 for producing visible or audible warning in response to the warning signal, whereby, the warning device can accurately detect dozing of the driver and produce a warning to make the driver wake up.

30 Claims, 14 Drawing Figures

WARNING DEVICE FOR A VEHICLE

FIELD OF THE INVENTION

The present invention relates to a warning system for an automotive vehicle and the like. More particularly, the invention relates to a warning system for a vehicle which detects dozing of a vehicle driver and produces a warning in response.

BACKGROUND OF THE INVENTION

If a vehicle driver dozes while driving the vehicle, driving operations distinct from operations performed under normal waking conditions will occur. Therefore, by detecting abnormal driving operations occurring when the driver dozes at the wheel, dozing of the driver can be detected. The dozing of the driver can be thus corrected by warning the driver when abnormal driving operations are performed.

Therefore, it is an object of the present invention to provide a warning system for a vehicle which detects specific driving operations likely to be performed during dozing of the driver to produce a warning.

SUMMARY OF THE INVENTION

The above-mentioned and other objects are accomplished by a warning system for a vehicle according to the present invention, which detects the frequency of steering operation within a unit time and produces a warning when the detected steering operation frequency exceeds a predetermined frequency which is preset to a frequency higher than that performed during normal driving. Furthermore, according to the present invention, if steering operations in the same direction are performed at an excessive frequency, the discrimination that the vehicle driver is steering through a curve will be made to prevent the device from producing the warning.

According to the preferred embodiment of the invention, the warning device for the vehicle comprises steering angle detecting means for detecting steering angle and steering direction and for producing a signal representative of detected steering angle and steering direction, a dozing detecting circuit for counting the occurrences of steering operations within a predetermined period, for clearing the counted value when a signal indicative of a constant steering direction is produced for a time duration longer than a predetermined time, and for producing a warning signal when the counted value exceeds a predetermined threshold value, a warning means for producing the warning in response to the warning signal.

DESCRIPTION OF THE PREFERRED EMBODIMENTS

Figure 1:
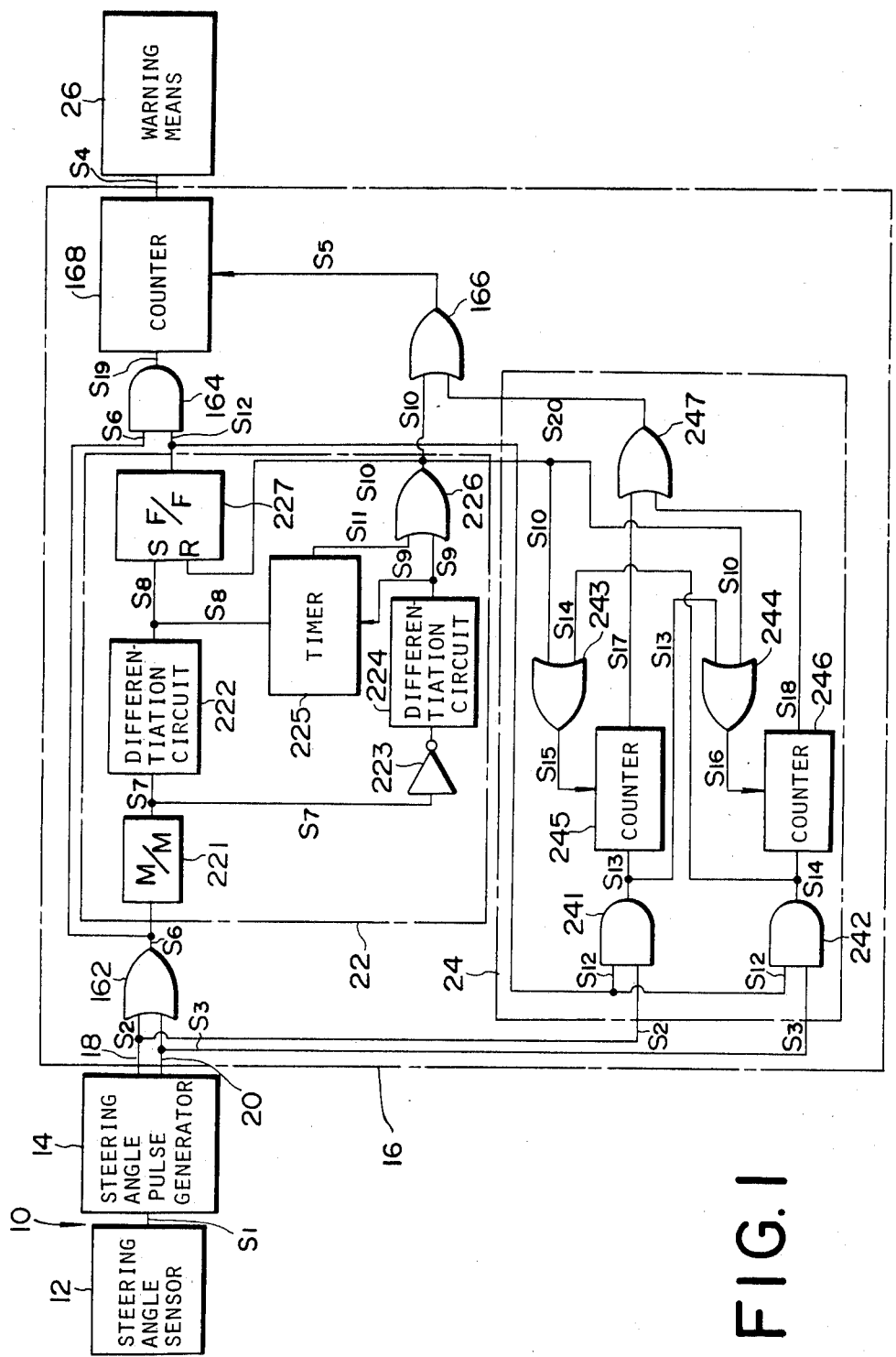
FIG. 1 is a block diagram of a first embodiment of a warning device according to the present invention.
Figure 2:
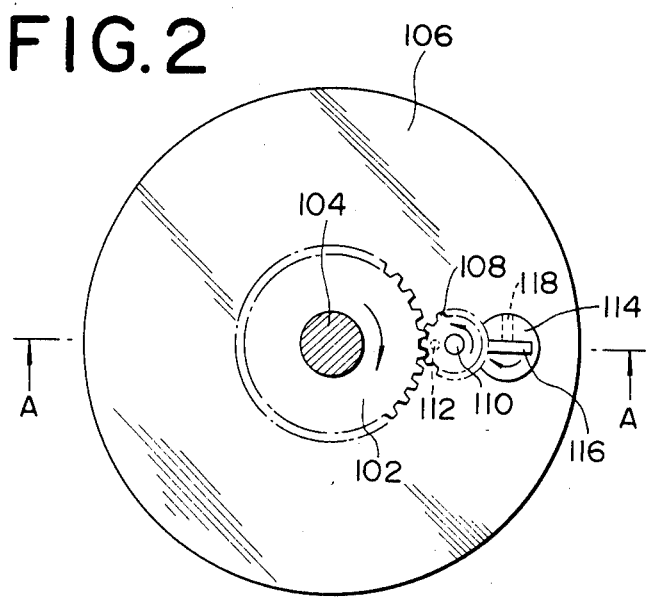
FIG. 2 is a plan view showing a steering angle sensor employed by the warning device of FIG. 1.
Figure 3:
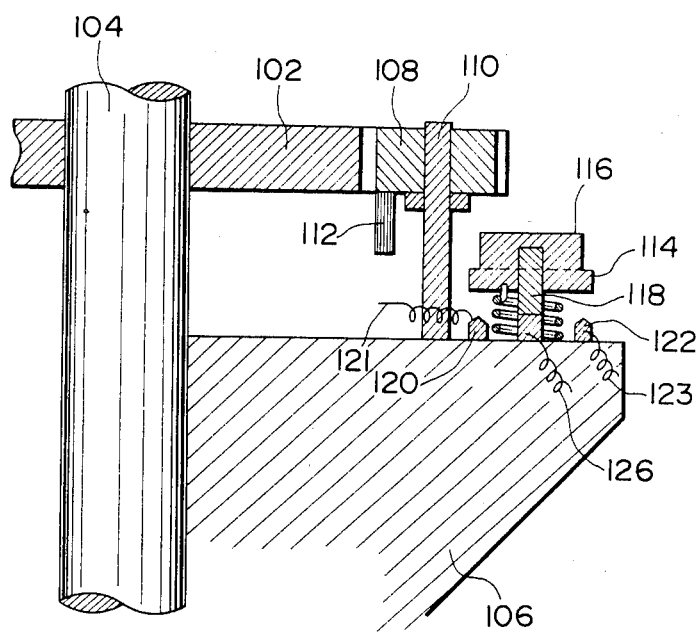
FIG. 3 is a section taken along line A—A of FIG. 2.
Figure 4:
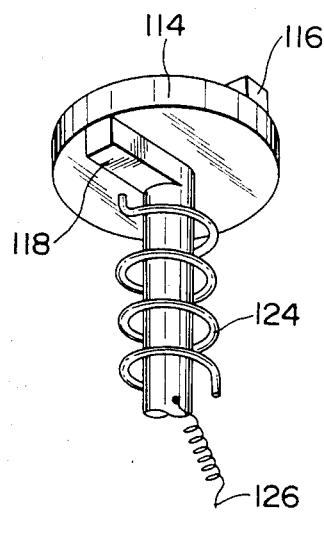
FIG. 4 is a perspective view of part of the steering angle sensor of FIG. 2, viewed from an angle revealing the movable contact thereof.
Figure 5:
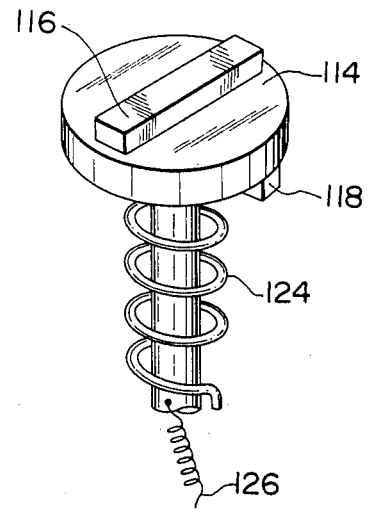
FIG. 5 is a perspective view of part of the steering angle sensor of FIG. 2, viewed from an angle revealing the upper surface thereof.

The preferred embodiments of the present invention will be described hereinafter with reference to the attached drawings. FIG. 1 shows the first embodiment of a warning system according to the present invention. The steering angle of the vehicle is detected by a steering angle sensor 12. The steering angle sensor produces a steering angle signal $S_1$ representative of the steering angle and steering direction. The steering angle signal $S_1$ is inputted to a steering angle pulse generating circuit 14. The steering angle pulse generating circuit 14 in conjunction with the steering angle sensor 12 constitutes a steering angle detector 10. The steering angle pulse generator 14 produces steering angle pulses $S_2$ and $S_3$, respectively representative of different steering directions, in response to a predetermined steering angle change. In the preferred embodiment, the steering angle pulse generating circuit 14 produces a steering angle pulse $S_2$ for every 5 degrees of counterclockwise steering change and a steering angle pulse $S_3$ for every 5 degrees of clockwise steering change.

The steering angle pulse generating circuit 14 is connected to a dozing detecting circuit 16 via leads 18 and 20. The steering angle pulse $S_2$ is fed to the dozing detecting circuit 16 via the lead 18 and the steering angle pulse $S_3$ is fed to the dozing detection circuit via the lead 20. The dozing detecting circuit 16 comprises a warning signal generating section 22 and a control section 24 for controlling operation of the warning signal generating section 22. The warning signal generating section 22 counts the steering angle pulses inputted thereto within a predetermined period of time and produces a warning signal $S_4$ when the counted value exceeds a predetermined threshold value. The control section 24 counts the pulses of either steering angle signal $S_2$ or $S_3$ sequentially inputted thereto and produces a reset signal $S_5$ when the counted value thereof exceeds a predetermined value in order to clear the counted value of the warning signal generating section 22. The control section 24 clears its own counted value in response to a pulse from the steering angle signal $S_3$ or $S_2$ other than the one being counted. Therefore, the warning signal generating section 22 produces a warning signal $S_4$ when steering is performed in opposite directions at more than a predetermined frequency. The warning means 26 is driven in response to the warning signal $S_4$. The warning means 26 produces any warning which can awake the driver and may provide, for example, a buzzer, a warning voice, discharge of cold air into the driver's face, a display, a lamp and so on just as long as an appropriate device for producing the selected warning is employed as the warning device.

Figure 6:
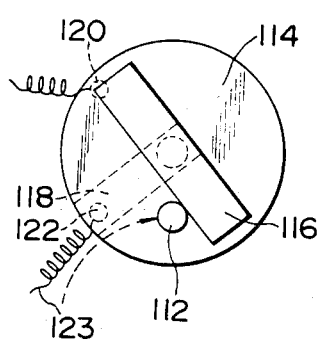
FIG. 6 is a plan view of the steering angle sensor rotated toward clockwise direction.
Figure 7:
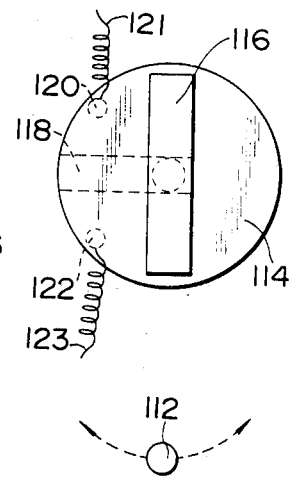
FIG. 7 is a plan view similar to FIG. 6 and showing the steering angle sensor at a neutral position.

FIGS. 2 to 9 show the detail of the steering angle detector in the first embodiment. A first gear 102 is fixed at its center portion to a steering column shaft 104 so as to rotate together with the steering column shaft 104 and a column tube 106. A second gear 108 engages the first gear 102. The second gear 108 is rotatably supported by a shaft 110 fixed at its bottom end to the column tube 106. In this embodiment, the gear ratio of the first gear 102 to the second gear 108 is preferably set at 3 to 1 so that, when the first gear 102 rotates once, the second gear 108 rotates three times. The second gear 108 has a first member 112 extending downwards from the bottom of the second gear 108 and positioned near the periphery thereof. A second member 114 of disc-shaped configuration has a strip-like projection 116 on the upper surface of second member 114. The lower end of the first member 112 is positioned in such a way that, when the first member 112 moves in response to the rotation of the second gear 108, it can push the projection 116 together with the second member 114 so that the second member 114 will rotate through a predetermined angle. The second member 114 has a strip-like movable contact 118 on the lower side thereof adapted to contact one of a pair of a stationary contacts 120 and 122, shown in FIG. 3, when the second member 114 rotates to either of two given positions. Those stationary contacts 120 and 122 are attached to the top of the column tube 106. The second member 114 is biased by a coil spring 124, shown in FIG. 4, so as to be normally held in a neutral position as shown in FIG. 7, where the movable contact 118 is centered between the stationary contacts 120 and 122. The movable contact 118 is connected through a lead wire 126 to a power source (not shown). The stationary contacts 120 and 122 are connected through lead wires 121 and 123 to the steering angle pulse generating circuit 14 of FIG. 1.

Figure 8:
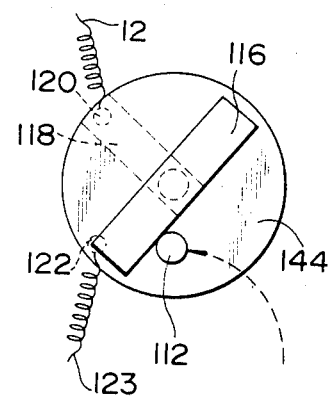
FIG. 8 is a plan view similar to FIG. 6 and showing the steering angle sensor rotated counterclockwise.

The operation of the above-mentioned steering angle detector will be described hereafter. When the steering wheel (not shown) rotates clockwise, the steering column shaft 104 rotates clockwise together with the first gear 102 whereby the first member 112 rotates counterclockwise together with the second gear 108. Thus, the first member 112 thereby comes to contact with the projection 116 of the second member 114 due to this counterclockwise rotation. Thus, the second member 114 is rotated clockwise by the pushing force of the first member 112 of the second gear 108 against the biasing force of the spring 124 so that the movable contact 118 thereof comes into engagement with the stationary contact 120 as shown in FIG. 8. As the second gear 108 rotates further counterclockwise, the projection 116 of the second member 114 separates from the first member 112. As a result, the second member 114 rotates to return to its neutral position due to the biasing force of the spring 124. On the other hand, when the first gear 102 rotates counterclockwise, the second gear 108 rotates clockwise together with the first member 112 whereby the first member 112 comes into engagement with the projection 116 of the second member 114. The clockwise movement of the first member 112 urges the second member 114 to rotate counterclockwise so that the movable contact 118 of the second member 114 comes into contact with the stationary contact 122 as shown in FIG. 6. When the second gear 108 rotates further in the same direction, the projection 116 of the second member 114 separates from the first member 112 so that the second member 114 rotates to return to its neutral position as shown in FIG. 7.

When the movable contact 118 engages either of the stationary contacts 120 and 122, a pulse is sent to the steering pulse generating circuit 14.

Figure 9:
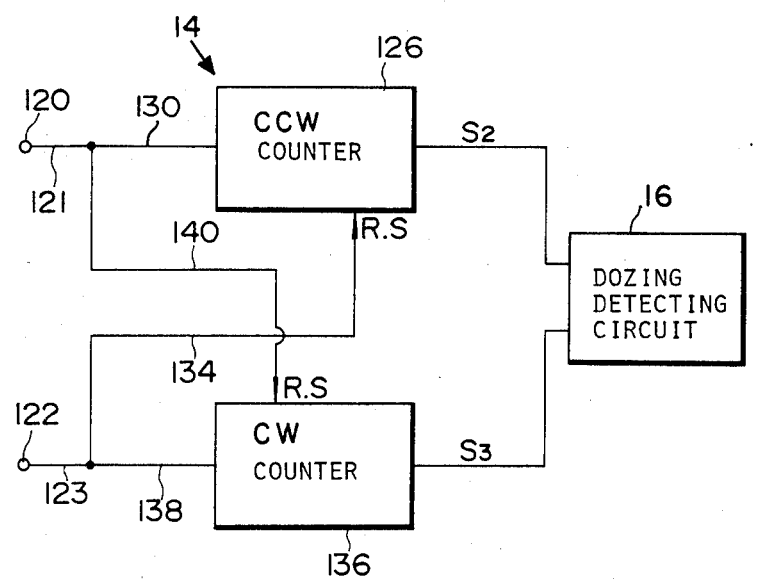
FIG. 9 is a block diagram of the steering angle pulse generator of FIG. 1.

FIG. 9 shows a block diagram that illustrates an example of the steering angle pulse generating circuit 14. A first counter 126 is connected through the lead wires 121 and 130 to the stationary contact 120 and through the lead wires 123, 134 to the contact 122. The second counter 136 is also connected to the contacts 120 and 122 via leads 121, 140 and 123, 138, respectively, and counts the number of clockwise rotations of the first member 112 upon receipt of signals from the lead wire 138. When the steering wheel begins to rotate in the opposite direction the second counter 136 is reset upon receipt of a signal from the lead wire 140. The first counter 126 counts the number of rotations of the first member 112 upon receipt of signals from the lead wire 130. When the steering wheel begins to rotate in the other direction, the first counter 126 is reset upon receipt of a signal from lead wire 134.

The first and second counters 126 and 136 produce steering angle pulse signals $S_2$ and $S_3$ respectively when the counted value reaches a predetermined value corresponding to a 5 degree change in steering angle.

Figure 10:
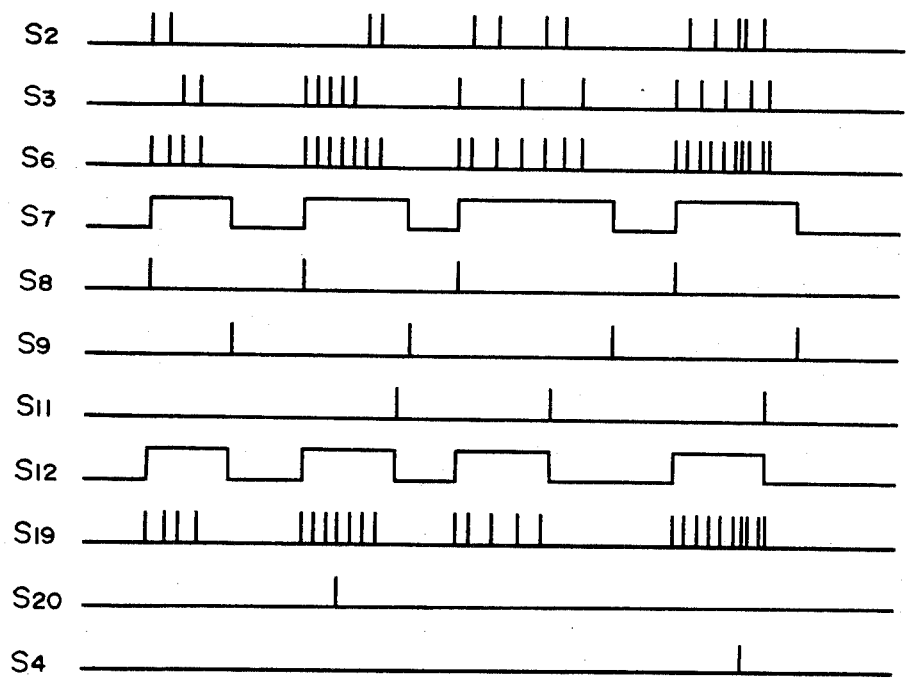
FIG. 10 is a timing chart for the warning device of FIG. 1.

Next, details of the dozing detecting circuit 16 will be described with reference to FIGS. 1 and 10. The steering angle pulses $S_2$ and $S_3$ produced by the steering angle pulse generating circuit 14 are inputted to an OR gate 162 of the dozing detecting circuit 16 via lead wires 20 and 18. The OR gate 162 is responsive to either steering angle pulse $S_2$ and $S_3$ to turn ON to produce an output $S_6$. The output $S_6$ of the OR gate 162 is inputted to a monostable multivibrator 221 of the warning signal generating section 22. The monostable multivibrator 221 is responsive to the output $S_6$ of the OR gate 162 to turn on for a predetermined period, for example, 5 sec., to produce an output $S_7$. The output $S_7$ of the monostable multivibrator 221 is fed to a differentiation circuit 222. The differentiation circuit 222 detects the rising edge of the monostable multivibrator output $S_7$ to produce an output pulse $S_8$. Additionally, the output $S_7$ of the monostable multivibrator 221 is inverted by an inverter 223 and then inputted to a differentiation circuit 224. The differentiation circuit 224 thus detects the trailing edge of the monostable multivibrator output $S_7$ to produce an output pulse $S_9$.

A timer 225 is responsive to the differentiation circuit output $S_8$ to start measuring time and produces an output $S_{11}$ for a predetermined period, e.g., 15 sec., after receiving the pulse $S_8$. The output $S_9$ of the differentiation circuit 224 serves as reset signal for the timer 225.

The differentiation circuit 222 is connected to the set input S of a flip-flop 227 to set the latter with the output $S_8$. The reset input R of the flip-flop 227 is connected to an OR gate 226. The OR gate 226 produces an output $S_{10}$ in response to pulses from either the differentiation circuit output $S_9$ or timer output $S_{11}$. The output $S_{10}$ of the OR gate 226 serves as reset signal for the flip-flop 227. The flip-flop 227 produces a high-level output $S_{12}$ while it is in the set state.

The output terminal of the flip-flop 227 is connected to one of the input terminals of each of two AND gates 241 and 242 of the control section 24 which controls the warning signal generating section 22. The other input terminals of the AND gates 241 and 242 are respectively connected to the leads 18 and 20 of the steering angle pulse generating circuit 14. The AND gates 241 and 242 are responsive to the steering angle pulses $S_2$ and $S_3$ to produce outputs $S_{13}$ and $S_{14}$ respectively, under the condition that the output $S_{12}$ of the flip-flop 227 is high. A counter 245 is connected to the AND gate 241 to count the pulses of AND gate output $S_{13}$ produced in response to the steering angle pulse $S_2$. A counter 246 is connected to the AND gate 242 to count the pulses of the AND gate output $S_{14}$ produced in response to the steering angle pulse $S_3$. The counters 245 and 246 are both connected to an OR gate 226 of the warning signal generating section 22 via respective OR gates 243 and 244. The OR gate 243 is also connected to the output terminal of the AND gate 242. The OR gate 243 produces an output $S_{15}$ in response to either the output $S_{10}$ of the OR gate 226 or the output $S_{13}$ of the AND gate 242. The output $S_{15}$ of the OR gate 243 serves as a reset signal for the counter 245 to clear the counter value. The OR gate 244 is connected to the output terminal of the AND gate 241. The OR gate 244 produces an output $S_{16}$ in response to either the output $S_{10}$ of the OR gate 226 or the output $S_{13}$ of the AND gate 241. The output $S_{16}$ of the OR gate 244 is inputted to the counter 246 to clear the counter value thereof. The counters 245 and 246 produce respective outputs $S_{17}$ and $S_{18}$ when their counter values reach predetermined values.

The output of the flip-flop 227 is inputted to the AND gate 164. The AND gate 164 is responsive to the output $S_6$ of the OR gate 162 under the condition that the output $S_{12}$ is high, to produce an output $S_{19}$. The output $S_{19}$ of the AND gate 164 is inputted to the counter 168. The reset terminal of the counter 168 is connected to the output terminal of the OR gate 166. One of the input terminals of the OR gate 166 is connected to the output terminal of the OR gate 226 and the other input terminal thereof is connected to the output terminal of the OR gate 247. The OR gate 247 is turned on to produce an output $S_{20}$ in response to either of outputs $S_{17}$ or $S_{18}$ of the counters 245 and 246 respectively. The OR gate 166 produces a reset signal $S_5$ in response to either the output $S_{10}$ of the OR gate 226 or the output $S_{20}$ of the OR gate 247. The counter 168 is responsive to the reset signal $S_5$ to clear the counter value.

The counter 168 produces a warning signal $S_4$ to be fed to the warning means 26 of FIG. 1 when the counter value thereof reaches a predetermined value. The counter 168 clears its counter value at the same time it produces the warning signal $S_4$.

In the above construction, the operation will be described with reference to the timing chart of FIG. 10. When right hand steering pulse $S_2$ or left hand steering pulse $S_3$ is outputted from the steering angle pulse generator 14, the OR gate 162 outputs the pulse signal $S_6$. The monostable multivibrator 221 is responsive to pulses of the signal $S_6$ to turn on for the predetermined period, for example, 5 sec. If the next pulse signal $S_6$ is inputted during the period in which the monostable multivibrator is kept ON, the period is prolonged. Therefore, absence of the output of the monostable multivibrator 221 indicates that the pulse signal $S_6$ has not been produced for at least 5 sec. The rising edge of the output of the monostable multivibrator 221 is detected by the differentiation circuit 222. The differentiation circuit 222 produces the output $S_8$ each time it detects a rising edge of the monostable multivibrator output. In addition, the output of the monostable multivibrator 221 is inputted to the differentiation circuit 224 via the inverter 223. The differentiation circuit 224 detects the falling edge of the output $S_7$ to produce the output $S_9$. The flip-flop 227 is set by the output $S_8$ of the differentiation circuit 222 to output a high-level signal $S_{12}$. At the same time, the timer 225 turns ON in response to the output $S_8$ of the differentiation circuit 222 and outputs the signal $S_{11}$ when a preset time period, e.g., 15 sec. expires. The flip-flop 227 is reset by the output $S_{10}$ of the OR gate 226. The flip-flop 227 feeds a signal having value "1" to the AND gate 164 until it is reset. The counter 168 counts the output pulses $S_{19}$ of the AND gate 164 to count the occurrence of the steering angle pulses $S_2$ and $S_3$. The counter 168 produces the warning signal $S_4$ when the counter value reaches a predetermined value, e.g., 7. On the other hand, while the flip-flop 227 is maintained at ON position, the AND gates 241 and 242 conduct the right-hand and left-hand steering angle pulses $S_2$ and $S_3$. The counters 245 and 246 count respective steering angle pulses $S_2$ and $S_3$. Respective counters 245 and 246 operate to feed the reset signal $S_5$ to the counter 168 via the OR gate 247 and the OR gate 166 when either counter value reaches the predetermined value, e.g., 4. In the foregoing embodiment, when the steering operation is in a constant direction, for example, driving through a curve, the counter value of the counter 168 is reset by the reset signal $S_5$ and thus the warning signal will not be produced. In other words, when alternating-direction steering operations which produce less than 4 sequential right-hand or left-hand steering angle pulses $S_2$ and $S_3$, are effected and when the counted value of the steering angle pulses $S_2$ and $S_3$ reaches 7, the warning means 26 produces a warning.

Figure 11:
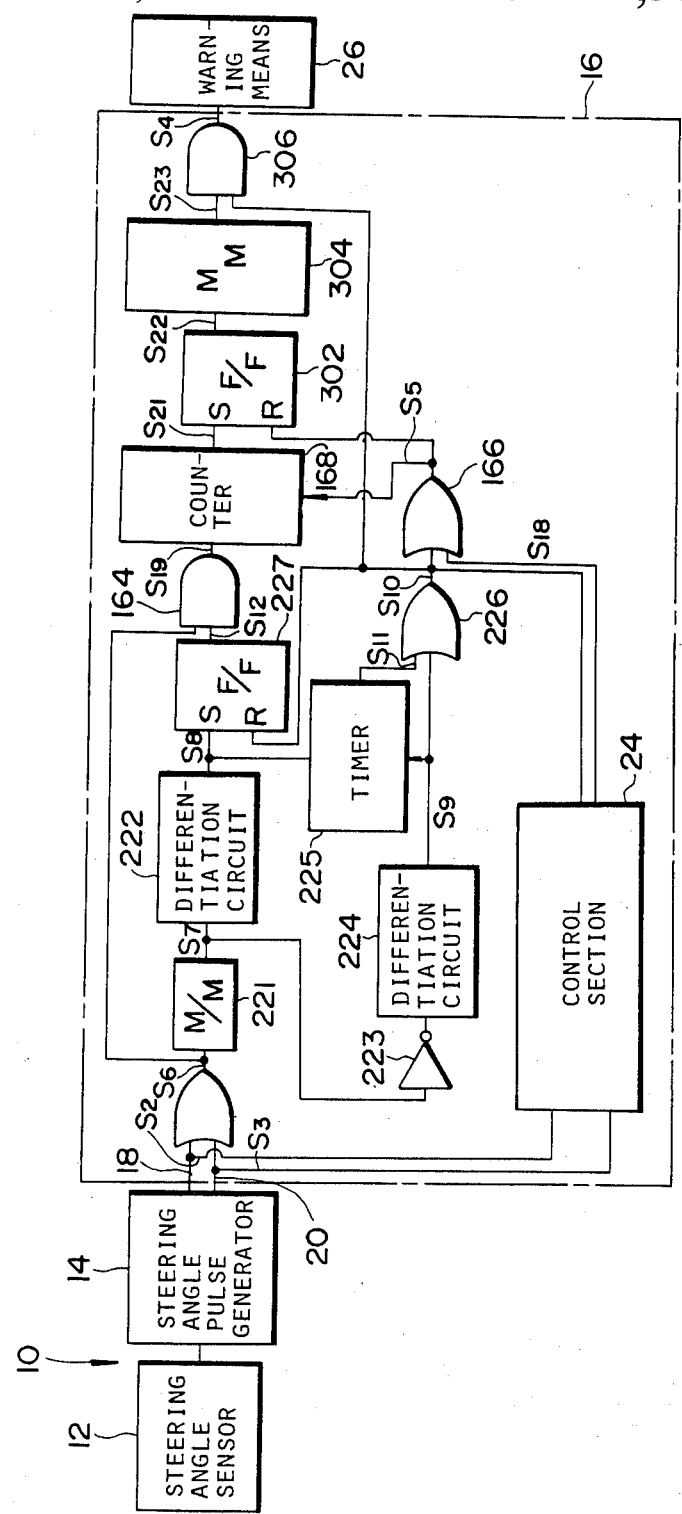
FIG. 11 is a block diagram of the second embodiment of the warning device of the present invention.

Referring to FIG. 11, there is illustrated the second embodiment of the present invention, in which the warning means is not instantly responsive to the warning signal $S_{12}$. In this embodiment, the warning signal $S_{12}$ is held for a predetermined time period and the warning means produces the warning after expiration of the foregoing time period and only if the signal indicative of steering through a curve is not inputted during that predetermined period. Elements analogous to those of the foregoing first embodiment are represented by the same reference numerals and thus further explanation therefor is neglected in the description given hereinbelow. In addition to the first embodiment, there are provided a flip-flop 302 which can be set by a first warning signal $S_{21}$ and reset by the output of the OR gate 166, a monostable multivibrator 304 detecting the falling edge of the output of the flip-flop and turning on for a predetermined time period after detecting the falling edge of the flip-flop output, and an AND gate 306, receiving inputs from the monostable multivibrator 304 and the OR gate 226, which produces an output to be fed to the warning means 26.

Figure 12:
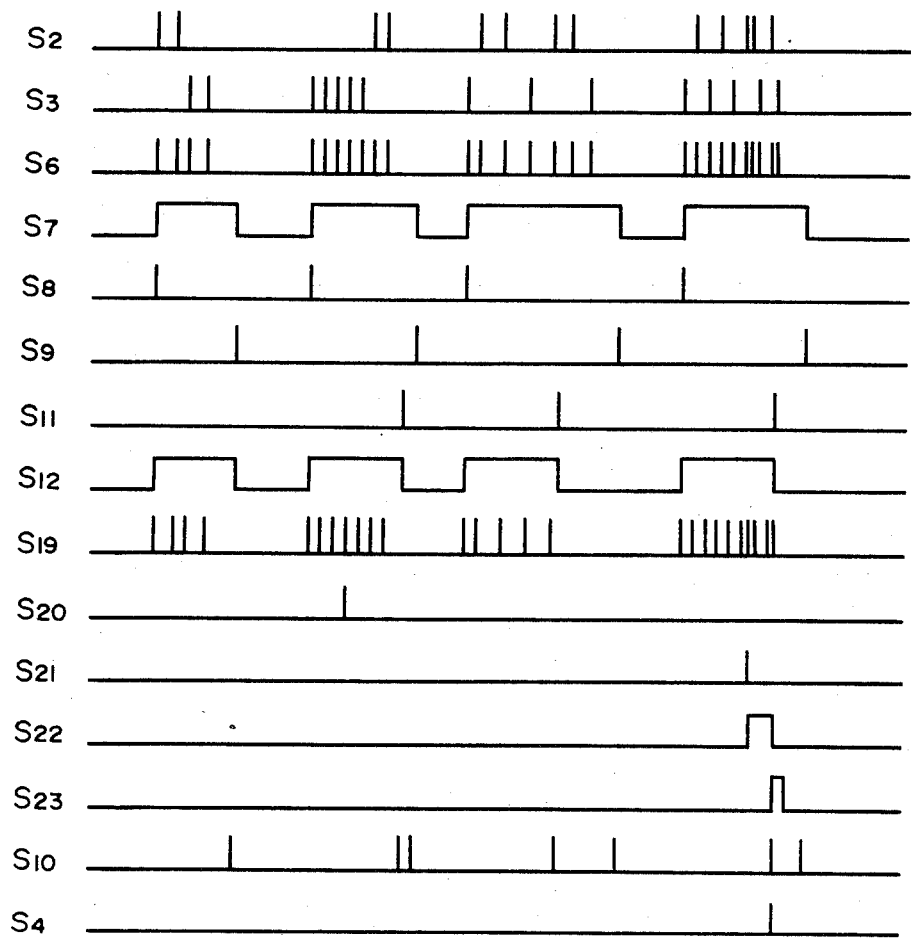
FIG. 12 is a timing chart for the warning device of FIG. 11.

In the above construction, the function will be described with reference to the timing chart of FIG. 12. When the first warning signal $S_{21}$ is outputted from the counter 168, the flip-flop 302 is turned on to produce a signal $S_{22}$. At the time the level of the flip-flop 302 output $S_{22}$ drops in response to the output $S_5$ of the OR gate 166, which is indicative of expiration of counting time, the monostable multivibrator 304 is turned ON for the predetermined time period to produce an output $S_{23}$. Therefore, when the reset signal $S_2$ is outputted from the control signal 24 during the steering pulse counting period, the AND gate 306 is prevented from producing the second warning signal $S_4$. Thus, only when the reset signal S₅ is not produced will the warning signal S₄ be fed to the warning means 26.

Figure 13:
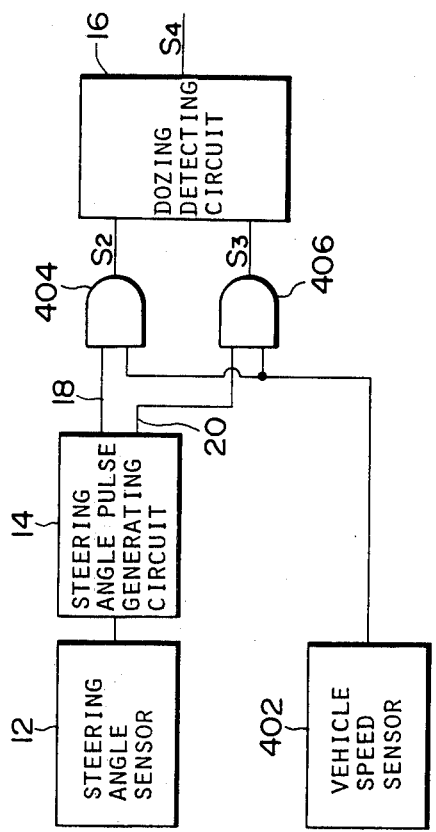
FIG. 13 is a block diagram of the third embodiment of the warning device of the present invention.

FIG. 13 shows the third embodiment of the present invention. In this embodiment, a vehicle speed sensor 402, for producing an output "1" when the vehicle speed is higher than a preset speed, and AND gates 404 and 406, permitting the steering angle pulses S₂ and S₃ from the steering angle pulse generator to pass therethrough under the condition that the output of the vehicle speed sensor 402 is high, are added to the foregoing first embodiment. Thus, the warning will not be created while driving through a city or at a relatively low speed.

Figure 14:
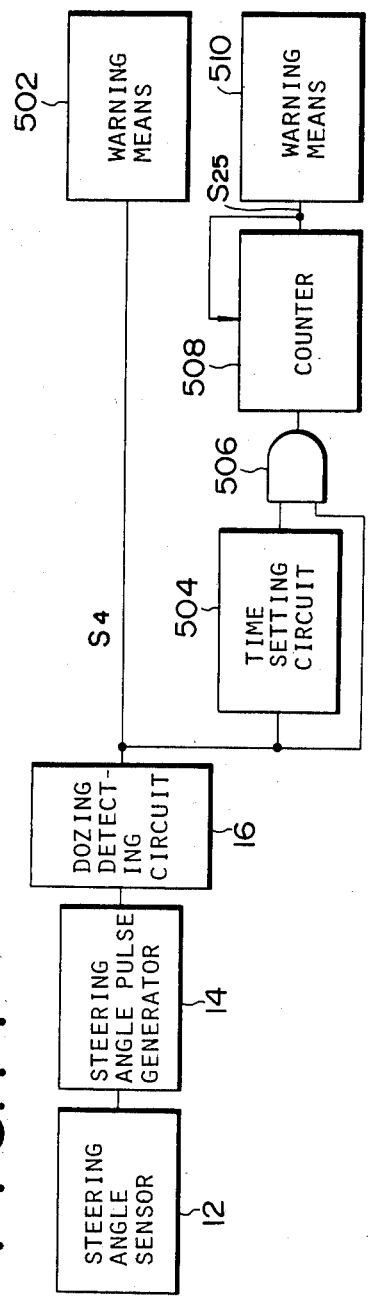
FIG. 14 is a block diagram of the fourth embodiment of the warning device of the present invention.

FIG. 14 shows the fourth embodiment of the present invention. The fourth embodiment comprises a first warning section 502 which receives the warning signal S₂₄ directly, a time setting circuit 504 to be turned on for a predetermined time period in response to the warning signal S₂₄, an AND gate 506 permitting the warning signal S₄ to pass therethrough only when the time setting circuit 504 is in the ON condition, a counter 508 for counting the pulses from the AND gate 506 to produce a second warning signal S₂₅ and resetting the counter value thereof when the counter value reaches a predetermined value and a second warning section 510 respective to the second warning signal S₂₅ to produce a warning, in addition to the construction of the foregoing first embodiment. The first warning section 502 produces warning via a visible display, lighting a lamp or the like as a gentle warning. When the dozing detecting circuit 16 sequentially and continuously produces the warning signal S₂₅, the second warning section 510 produces a rather strong warning such as a buzzer, a warning voice, discharging cold air or the like.

As described hereabove, according to the present invention, when variation of the steering angle position from a certain standard steering angle continues in the same direction at a rate exceeding a predetermined frequency, indication is given that the vehicle is being steered through a curve in order to inhibit counting of the steering frequency. If the steering operations in alternating directions exceed the predetermined frequency, the warning is produced. This ensures detection of drowsiness of the driver and thus can effectively prevent the driver from falling asleep.

We claim:

1. A warning device for a vehicle comprising:
 steering angle detecting means for detecting steering angle and direction and for producing signals representative of the detected steering angle and direction;
 dozing detecting means responsive to said signals for measuring steering frequency within a predetermined time period and for producing a warning signal and clearing said measured frequency when said measured frequency exceeds a threshold value; and
 a warning means for producing a warning in response to said warning signal.

2. A warning device for a vehicle comprising:
 a steering angle detecting means for producing pulse signals whenever variation of the steering angular position from a predetermined standard position exceeds a predetermined angle;
 a dozing detecting means including
  a warning signal generating means for counting pulses of said pulse signals and producing a warning signal when the counted value reaches a threshold value within a predetermined time period, and
  a control means for counting pulses of said pulse signals representing the steering angle variation in only one direction to produce a reset signal for clearing the counted value of said warning signal generating means when the value counted by said control section reaches a predetermined value; and
 a warning means for producing a warning in response to the warning signal.

3. A device as set forth in claim 2, wherein said dozing detecting means further comprises a timer means starting simultaneously with the counting operation of said warning signal generating means for measuring time and producing an output when a given period of time is expired; and counter means for counting the pulses of said pulse signals and connected for being cleared in response to said output of the timer means.

4. A device as set forth in claim 3, wherein said control means comprises first and second counters which respectively count the pulses of said signals representative of respective opposite steering directions, each of said first and second counters responsive to the output of the timer means and the signal of the other of said first and second counters of the control means to clear the counter value thereof, said counters of the control means also being cleared in response to a reset signal produced when the counter value of the counters of the control means reaches a predetermined value.

5. A device as set forth in claim 4, wherein said counter means is connected to be reset by signals from said first or second counters and is further connected to provide the warning signal to the warning means via a delay circuit means for providing the warning signal after a predetermined delay time expires, and said delay circuit means further operative for cancelling the warning signal when the reset signal fed from the control means is inputted thereto within the predetermined delay time.

6. A device as set forth in claim 4, which further comprises a vehicle speed sensor means for detecting vehicle speed and producing an output when the detected vehicle speed is higher than a given speed and gate means for permitting the signals of the steering angle detecting means to be inputted to the dozing detecting means when the output of the vehicle speed sensor is produced.

7. A device as set forth in claim 4, wherein said warning means comprises a first warning means directly connected with the dozing detecting means to immediately respond to the warning signal to produce a first warning and a second warning means connected to the dozing detecting means via a delay circuit for producing a second warning after expiration of a preset delay time.

8. A method for waking the driver of a vehicle from dozing comprising the steps of:
 detecting steering angle and direction to measure steering frequency;
 comparing the measured frequency with a predetermined threshold value to produce a warning for waking the driver when the measured frequency value is equal to or more than the threshold value.

9. A method as set forth in claim 8, comprising the further step of clearing said measured frequency value when the frequency of sequential steering operations in a single direction exceeds a predetermined value.

10. A method as set forth in claim 9, comprising the further steps of producing said warning with a predetermined time delay after the measured value exceeds the threshold value, and inhibiting production of the warning if sequential steering operations in a single direction exceed a predetermined number within the predetermined time delay and thus the measured frequency value is cleared.

11. A method as set forth in any one of claims 8, 9 or 10, which further comprises the step of measuring vehicle speed and effecting measurement of the steering frequency when the measured vehicle speed is higher than a predetermined speed.

12. A method as set forth in claim 8, 9 or 10, comprising the further steps of producing a first warning to wake the driver when the measured frequency value exceeds said threshold value and producing a second warning when a predetermined delay time expires and the frequency value has not been cleared.

13. A warning device for a dozing vehicle driver comprising:
   steering angle detecting means for detecting steering angular variation and producing a first steering angle indicative signal whenever the steering angular variation in one direction exceeds a predetermined angle and a second steering angle indicative signal whenever the steering angular variation in the other direction exceeds a predetermined angle;
   dozing detecting means, responsive to said first and second steering angle indicative signals, for detecting a number of occurrences of said first and second steering angle indicative signals within a given period of time to produce a warning signal when the number of detected occurrences equals or exceeds a predetermined threshold; and
   a warning means for producing a warning in response to said warning signal.

14. A warning device for a dozing vehicle driver comprising:
   a steering angle detecting means for detecting steering angular variation and producing a pulse form first steering angle indicative signal in response to variation of steering angular position in one direction exceeding a predetermined angle and a pulse form second steering angle indicative signal in response to variation of steering angular position in the other direction exceeding a predetermined angle;
   dozing detecting means, responsive to said first and second steering angle indicative signals, for counting said first and second signals to produce a warning signal when the counted value reaches a predetermined threshold, said dozing detecting means measuring a period of time in which said first and second steering angle indicative signals are counted, to clear the counted value when the measured period of time equals or exceeds a given time threshold; and
   warning means for producing a warning in response to said warning signal.

15. A warning device for a dozing vehicle driver, comprising:
   steering angle detection means detective of frequency of oscillation of a steering wheel for producing a first steering angle indicative signal in pulse form at each time the variation of steering angular position in one direction exceeds a predetermined value and a second steering angle indicative signal in pulse form at each time the variation of steering angular position in the other direction exceeds said predetermined value;
   dozing detecting means for mounting said first and second steering angle indicative signals to produce a warning signal when the counted value reaches a predetermined threshold within a given period of time;
   reset signal generator means for counting one of said first and second steering angle indicative signals to produce a reset signal for resetting said dozing detecting means when the counted number of said one of said signals reaches a given value; and
   a warning means for producing a warning in response to said warning signal.

16. A device as set forth in claim 13, which further comprises a reset signal generator means associated with said dozing detecting means for detecting occurrence of one of said first and second steering angle indicative signals to produce a reset signal for resetting said dozing detecting means when the detected occurrences of said one of said signals reaches a given value, said dozing detecting means including a counter means for counting said first and second steering angle indicative signals, said counter means connected for clearing the counter value thereof when said given period of time expires.

17. A device as set forth in claim 14, which further comprises a reset signal generator means associated with said dozing detecting means for counting one of said first and second steering angle indicative signals to produce a reset signal for resetting said dozing detecting means when the counted number of said one of said signals reaches a given value,
   said dozing detecting means including a counter for counting said first and second steering angle indicative signals and a timer for measuring a period of time to produce a timer output when said given time threshold expires.

18. A device as set forth in claim 15, wherein said dozing detecting means includes a timer means connected for starting simultaneously with the counting operation of said first and second steering angle indicative signals for measuring time and producing a timer output when a given period of time expires.

19. A warning device for preventing a vehicle driver from dozing at the wheel, comprising:
   a first detector detecting variation of steering angular position and producing a first pulse form signal indicative of steering angular variation in one direction and a second pulse form signal indicative of steering angular variation in the other direction;
   a second detector counting said first and second signals occurring within a given period of time to detect extraordinarily high frequency of steering angular variations exceeding a given threshold and producing a warning signal when the counted value exceeds a predetermined threshold;
   a third detector counting one of said first and second signals for detecting a driving condition of passing through a curved road by detecting continuous occurrence of one of said first and second signals, and producing a reset signal for resetting said counted value in said second detector when the counted value of said third detector reaches a given reset threshold; and
   a warning device responsive to said warning signal to produce a warning.

20. A device as set forth in claim 19, wherein said third detector comprises a first counter for counting said first signal and producing said reset signal when the first counter value reaches said given value, and a second counter counting said second signal and producing said reset signal when the second counter value reaches said given value, said first counter responsive to said second signal to clear said first counter value and said second counter responsive to said first signal to clear said second counter value.

21. A device as set forth in claim 20, which further comprises a timer for measuring said given period of time to produce a timer signal for clearing the counted value in said second detector when said given period of time expires.

22. A device as set forth in claim 21, wherein said first and second counters in said third detector are associated with said timer to clear said first and second counter values in response to said timer signal.

23. A method for warning a vehicle driver dozing at the wheel, comprising the steps of:
  detecting angular variation of steering to produce a first signal evertime the angular variation of the steering in one direction exceeds a predetermined angle and to produce a second signal everytime the angular variation in the other direction exceeds said predetermined angle;
  counting said first and second signals to produce a warning when the counted value reaches a predetermined warning threshold;
  measuring a period of time running from starting of said counting of said first and second signals to clear said counted value when measured period reaches a given time threshold.

24. A method for preventing a vehicle driver from dozing, comprising the steps of:
  detecting angular variation of steering to produce a first signal in pulse form at each predetermined angle of angular variation of steering in one direction and a second signal in pulse form at each predetermined angle to angular variation of steering in the other direction;
  counting said first and second signals to produce a warning when the counted value reaches a predetermined warning threshold;
  detecting continuous occurrence of one of said first and second signals exceeding a predetermined reset threshold to produce a reset signal for clearing said counted value; and
  measuring a period of time running from starting of said counting operation of said first and second signals to clear said counted value when the measured period exceeds a given time threshold.

25. A method as set forth in claim 23, which further comprises the step of detecting continuous occurrences of one of said first and second signals in excess of a predetermined reset threshold to produce a reset signal for clearing said counted value.

26. A method as set forth in claim 24 or 25, which further comprises a step of providing a time delay after said counted value reaches said warning threshold, disabling production of said warning when continuous occurrence of one of said first and second signals exceeding said reset threshold is detected within said time delay, and clearing said counted value at the same time of disabling production of said warning.

27. A method as set forth in claim 24 or 25, which further comprises a step of producing a first warning when said counted value exceeds said warning threshold and producing a second warning when a predetermined time delay expires and said counted value is not cleared.

28. A device as set forth in claim 1, wherein said dozing detecting means further comprises a timer means starting simultaneously with a counting operation of said warning signal generating means for measuring time and producing an output when a given period of time is expired; and counter means for counting pulses of said signals representative of the detected steering angle and direction and connected for being cleared in response to said output of the timer.

29. A device as set forth in claim 28, further comprising a control means for counting said signals representative of the detected steering angle and direction, wherein said control means comprises first and second counters which respectively count the pulses of said signals representative of respective opposite steering directions, each of said first and second counters responsive to the output of the timer means and the signal counted by the other of said first and second counters of the control means to clear the counter value thereof, said counters of the control section also being cleared in response to a reset signal produced when the counter value of the counters of the control section reaches a predetermined value.

30. A warning device for a vehicle comprising:
  steering angle detecting means for detecting steering angle and direction and for producing signals representative of the detected steering angle and direction;
  dozing detecting means responsive to said signals for measuring steering frequency within a predetermined time period and responsive to measurement of a predetermined steering frequency within said predetermined time period and for producing a warning of driver drowsiness; and
  means for disabling said dozing detecting means in response to detection of a curved road driving condition by detection of a sequence of one of said steering signals representative of a continuous steering operation in one direction.

* * * * *